| United States Patent [19] | [11] 3,876,466 |
| Suzor | [45] Apr. 8, 1975 |

[54] MANUFACTURE OF SUGAR

[76] Inventor: Norland Louis Claude Suzor, Bo 5598, Nchalo, Malawi

[22] Filed: Oct. 30, 1972

[21] Appl. No.: 301,815

[30] Foreign Application Priority Data
  Oct. 30, 1971  South Africa...................... 71/5754

[52] U.S. Cl.................. 127/46 R; 127/58; 252/353
[51] Int. Cl. ........................... C13d 1/00; C13f 1/02
[58] Field of Search..................... 127/46 R; 252/353

[56] References Cited
UNITED STATES PATENTS

| 2,744,874 | 5/1956 | Fike | 252/353 X |
| 3,000,832 | 9/1961 | Kooijman | 252/353 X |
| 3,084,176 | 4/1963 | Dieckelmann | 252/353 X |
| 3,476,598 | 11/1969 | Sanders | 127/46 R X |

OTHER PUBLICATIONS

Chemical Abstracts, 65, 12395f (1966).

"Hackh's Chemical Dictionary," J. Grant, ed., Fourth Edition, 646, McGraw-Hill, New York, 1969.

*Primary Examiner*—Morris O. Wolk
*Assistant Examiner*—Sidney Marantz
*Attorney, Agent, or Firm*—Young & Thompson

[57] ABSTRACT

Method of reducing the viscosity of sugar solutions, such as massecuite, by the addition thereto of one or more aromatic organic sulphonic acids, their salts or derivatives, in sufficient quantity.

5 Claims, No Drawings

MANUFACTURE OF SUGAR

This invention relates to the lowering of the viscosity of sugar solutions particularly in the crystallisation stage and more particularly at the massecuite stage.

The separation of crystallised sugar from the massecuite is achieved by centrifugals, the crystals inside the drum being washed with water or steam. The boiling, cooling and centrifuging process is repeated a second and perhaps a third time until a final molasses is produced, which contains unrecoverable sugar because of the high content of non-sugars preventing crystallisation of the sugar, the increased solubility of the sucrose and the increased viscosity of the mother liquor.

The prevalent practices in the sugar industry for counteracting the viscosity of the massecuite and other solutions include the addition of water to dilute the massecuite with comcomitant solution of sucrose and therefor resulting in a reduced yield; and the re-heating prior to centrifuging which also results in solution of sucrose.

It is an object of the present invention to reduce the viscosity of massecuite or other sugar solutions with a minimum or elimination of dilution and/or re-heating.

According to the present invention, one or more aromatic organic sulphonic acids, their salts or derivatives are added to a sugar solution, preferably at a crystallisation stage, in sufficient quantity substantially to reduce the viscosity thereof.

In a preferred form of the invention, the additive is chosen from alkyl aryl sulphonate detergents and it has been found that the products sold by Shell Chemicals under the name TEEPOL CH53 or CH 31 or by ICI as ALKANATE DB are particularly useful.

The products listed above have the following characteristics. TEEPOL CH53 and TEEPOL CH31 - aqueous solutions of the sodium salts of biologically soft alkyl benzene sulphonates and non-ionic detergents. They are predominantly anionic in character.

ALKANATE DB - diodegradable detergent-active ingredient is the sodium salt of dodecyl benzene sulphonate.

References made to the above products in the specification and claims are to be taken to be references to such products only in so far as they continue to retain the characteristics specified above.

Results obtained with two of these products are recorded below, in which X is TEEPOL CH53, and Y is ALKANATE DB. For comparison purposes results obtained with TEEPOL 610 (additive Z) are also recorded. TEEPOL 610 has as active ingredient a sodium salt of a secondary alkyl sulphate.

As the fluidity of a massecuite is difficult to measure, and as frequently no correlation can be drawn between factory experience and laboratory measurements, these two following methods of testing were adopted.

METHOD I

Measuring the amperage of the motor driving crystalliser rotating cooling elements with a constant volume of massecuite in the crystalliser.

Trial to Compare Effect of Different Additives

Observations were made on massecuites boiled on same footing (made in the same graining pan and cut to the same finishing pan)

| Additive | Brix | Purity | Amperage of Crystalliser Motor | | | | | |
|---|---|---|---|---|---|---|---|---|
| | | | At Dropping | 1-hr | 2-hr | 3-hr | 4-hr | 8-hr |
| X | 98.04 | 55.2 | 4.5 | 4.5 | 4.5 | 4.5 | 4.7 | 4.8 |
| Y | 97.98 | 55.0 | 4.8 | 5.0 | 5.0 | 5.0 | 5.2 | 5.6 |
| Z | 97.80 | 54.8 | 4.8 | 5.2 | 5.2 | 5.6 | 6.0 | 6.3 |
| Nil | 98.13 | 55.6 | 5.2 | 5.6 | 5.7 | 5.9 | 6.4 | 7.1 |

The additives were added in the crystallisers at the dropping of the pans at the rate of 1,67 kg of 30% A.M. per 100 m³ of massecuite. It is assumed from above, that once the fluidity of the massecuite has been increased it more or less retained that low viscosity in case X even after cooling when the temperature had dropped from 68°C to 43°C.

The massecuites were then cured in three continuous centrifugals.

| Additive | Brix of Molasses | Purity Molasses | Purity of C Sugar | Dilution Water Added | Ft³/Hr |
|---|---|---|---|---|---|
| X | 82.2 | 36.4 | 89 | Nil | 225 |
| Y | 82.8 | 37.6 | 86.7 | Nil | 170 |
| Z | 82.6 | 39.1 | 85.2 | Nil | 140 |
| Nil | 84.3 | 40.3 | 82.6 | 45-gall. | 96 |

METHOD II

Measuring the weight of molasses forced out of a massecuite through a fine screen fitted to the bottom of a cylinder under constant air pressure in a given time.

Trial to Estimate Effect of Additive A

A footing for two C massecuites was made at the same time, and then half of it was cut to the finishing C pan. The first cutting was not treated with any additive and was dropped and a sample subjected to a pressure filtration test.

Then the second half of the footing was transferred to the same finishing pan and additive X was added at the rate of 1,67 Kg of 30% active material per 100m³ before drink of molasses. The massecuite was also subjected to the pressure test.

Test A

| Additive | Massecuite Bx | Massecuite Pur | Molasses Bx | Molasses Pur | Weight of Molasses | Time to collect Sample |
|---|---|---|---|---|---|---|
| Nil | 99.24 | 54.5 | 99.66 | 45.0 | 81.5 gm | 3½-hrs |
| X | 94.96 | 54.7 | 94.80 | 43.6 | 248 gm | 2½-hrs |

It was noticed that at the addition of the additive X, the conductivity reading on the cuitometer increased by 10% of the full scale deflection, and at the same time the temperature of the massecuite increased from 70°C to 75°C which was an indication of better circulation due to improved heat transfer.

Also the two Brixes in test $a$ were obtained with the same conductivity reading on the cuitometer so on Test $b$ compensation was made to have the same Brixes on both massecuites.

Test B

| Additive | Massecuite Bx | Pur | Molasses Bx | Pur | Weight of Molasses | Time to collect Sample |
|---|---|---|---|---|---|---|
| Nil | 98,18 | 54,6 | 95,52 | 46,8 | 100 gm | 3½-hrs |
| X | 96,66 | 54,3 | 94,56 | 44,0 | 125,7 gm | 1¼-hrs |

Table One gives the analyses of the average composite samples of final molasses produced.

Tests 1 to 3 no additive in massecuite.

Test 4: all pans were treated with X at the rate of 1,68 kg per 100 m³ after graining before growing the grain on molasses and 1,68 kg per 100 m³ halfway through the finishing pan and the same amount added in the crystalliser before centrifuging. No reheating was done on the massecuite and the purity of the C sugar was at an average of 89°.

Tests 5 to 8: no addition of X and C massecuite was reheated to enable maintaining centrifuging rate. Also during that period the purity of the sugar averages approximately 82°.

Tests 9 – 13: a footing for two C massecuites was made. The first cutting was not treated and the second cutting was treated the same way as in Test 4 mentioned above.

Tests 14 – 16: the full treatment of X was resumed.

It can be seen from Table One the reduction in purity of molasses achieved and the difference between the true purity and the Douwes Dekker target purity.

TABLE I

| Test | True Purity Sucrose Dry Solids | "Douwes Dekker" Target Purity |
|---|---|---|
| 1 | 45,5 | 42,4 |
| 2 | 49,0 | 44,5 |
| 3 | 46,7 | 44,6 |
| 4 | 40,8 | 43,4 |
| 5 | 46,1 | 44,1 |
| 6 | 48,3 | 45,6 |
| 7 | 44,0 | 41,6 |
| 8 | 50,5 | 46,9 |
| 9 | 43,9 | 43,9 |
| 10 | 46,6 | 46,4 |
| 11 | 46,3 | 46,7 |
| 12 | 45,3 | 46,4 |
| 13 | 46,0 | 46,1 |
| 14 | 43,2 | 44,6 |
| 15 | 43,4 | 45,1 |
| 16 | 44,6 | 44,8 |

In addition to the benefits described above, the volume of 'C' massecuite boiled can be reduced by graining on a mixture of 'B' molasses and syrup having a relatively high refractometric purity provided that the additive is added at the rate of 5 kg to each 100 m³ of footing before seeding the graining pan. This is possible because the crystal yield is far greater when the additive is used.

I claim:

1. A method of reducing the viscosity of sugar solutions including the step of adding a predetermined amount of an aromatic organic sulphonic acid or a salt or derivative thereof thereto.

2. The method as claimed in claim 1 in which the additive is an aqueous solution of the sodium salt of a biologically soft alkyl benzene sulfonate additionally containing a non-ionic detergent.

3. The method of claim 1 in which the additive is an alkyl aryl sulphonate detergent.

4. A method of reducing the viscosity of massecuite including the step of adding thereto one or more alkyl aryl sulphonate detergents in predetermined amounts.

5. The method as claimed in claim 1 in which the additive comprises the sodium salt of dodecyl benzene sulfonate.

* * * * *